Dec. 20, 1966   R. H. STOTZ   3,293,408
HEAT TRANSFER UNIT FOR SPACE HEATER
Filed June 4, 1964

INVENTOR.
RICHARD H. STOTZ
BY
Marshall, Wilson & Yeasting
attorneys

United States Patent Office 3,293,408
Patented Dec. 20, 1966

3,293,408
HEAT TRANSFER UNIT FOR SPACE HEATER
Richard Henry Stotz, 1411 River Drive,
Fremont, Ohio 43420
Filed June 4, 1964, Ser. No. 372,496
5 Claims. (Cl. 219—341)

This invention relates to electrically powered space heaters and in particular to an improved electrically powered water heater adapted to gravity feed the heated water to the cooperating radiators.

A major problem encountered with electrical heaters employing direct heat transfer from an electrical heating element to the air to be heated is the inability to transfer heat rapidly from a compact heating element to the air without operating the heating element at a temperature that scorches any dust or lint in the air and that constitutes a fire hazard in the event the air circulation over the element is inadvertently impeded or blocked. Heaters using a liquid intermediate heat transfer medium require substantial thermal gradients in the liquid of the system to promote circulation of the liquid.

The principal object of this invention is to provide a heat transfer chamber for an electrically powered space heater that provides a substantial thermal gradient in a small volume of liquid with low restriction to liquid flow.

Another object of the invention is to provide a compact heat transfer chamber of improved efficiency.

A still further object of the invention is to provide a compact heat transfer unit in which the transfer liquid flows as an extended sheet of liquid and the electrical heating element is located in the sheet and extends transversely to the direction of flow of the liquid.

A still further object of the invention is to provide a simple, easily manufactured heat transfer unit for an electrically powered space heater.

These and more specific objects and advantages are provided by a space heater constructed according to the invention.

According to the invention the improved heat transfer unit comprises an assembly of three parallel elongated chambers, an intermediate one of which is in communication with each of the others by means of continuous or intermittent slots extending a major distance along each chamber. The intermediate chamber is provided with an electrical heating element extending generally along the axis of the chamber a distance substantially equal to the over all length of the slots. The terminal chambers are fitted with connections to receive the ends of radiation tubing and serve as distributors, together with the slots, to distribute the incoming liquid substantially uniformly along the length of the heating element and to likewise uniformly collect the heated liquid for transfer to the radiation tubing.

A preferred form of the invention is illustrated in the accompanying drawings:

These specific figures and the accompanying description are merely intended to illustrate a preferred embodiment of the invention and not to limit its scope.

Figure 1:
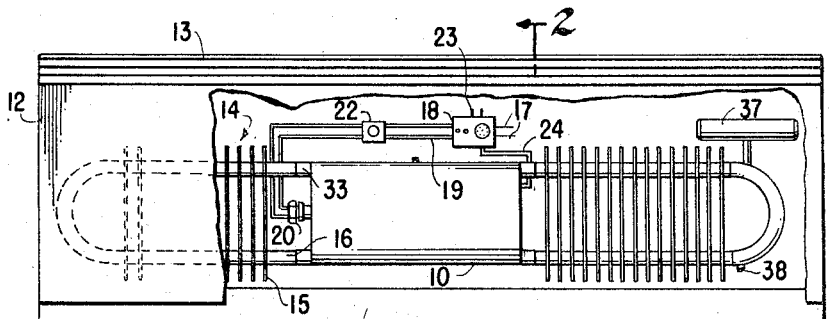
FIGURE 1 is a front elevation, with parts broken away and parts shown in section, of a baseboard type space heater employing the improved heat transfer unit.
Figure 2:
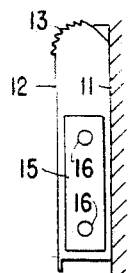
FIGURE 2 is a vertical section taken along the line 2—2 of FIGURE 1 showing the location of the radiation elements in the housing.

Referring to FIGURE 1 the improved heat transfer unit 10 is shown as installed in a section of a baseboard space heater. Such a heater includes a housing back panel 11 adapted to be attached to a wall studding in new construction or to the existing baseboard or plaster when installed in a previously constructed home. The housing also includes the front panel 12, the upper portion of which is provided with louvres 13 and the lower portion of which is spaced above the floor by a distance, in ordinary construction, of an inch to an inch and a half to provide an air inlet to heat radiating elements enclosed in the housing.

Within the space enclosed in the housing and extending one or both ways from the heat transfer unit 10 are sections of radiators 14 each comprising a large plurality of fins 15 fixedly mounted on tubes 16 carrying liquid heated in the heat transfer unit 10.

Figure 3:
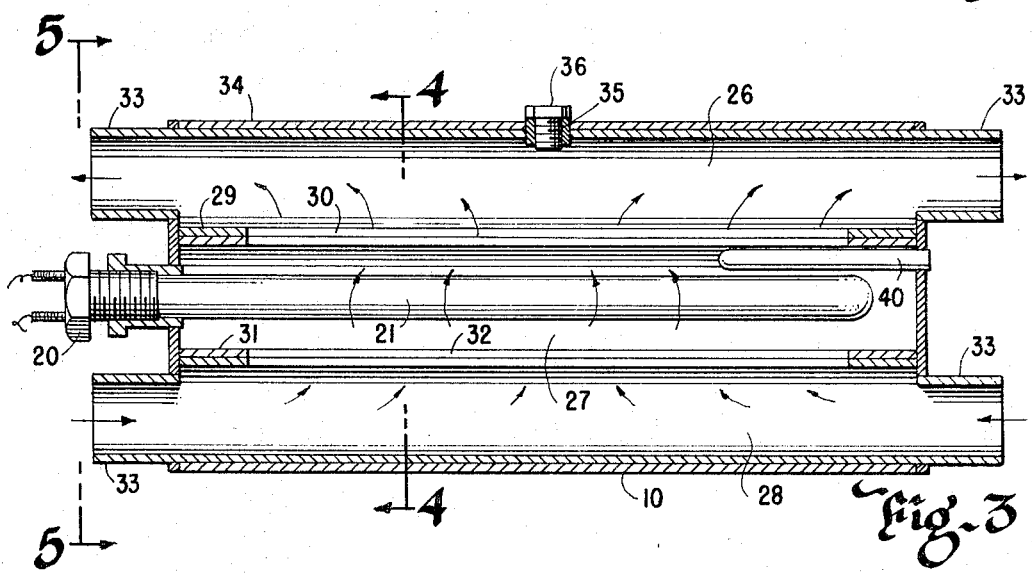
FIGURE 3 is an enlarged vertical section of the improved heat transfer unit.

Electrical power for the heat transfer unit is provided through power leads 17 connected to a control assembly 18 and thence through leads 19 to a connector 20 of an immersion type resistance heating element 21, FIGURE 3, installed in the heat transfer unit 10. A pilot light 22 may be provided to indicate when electrical current is flowing in the heating element 21. The control assembly 18 also has control leads 23 adapted to be connected to an externally located thermostat and a connection 24 to a high temperature limit thermostat installed in the heat transfer unit itself. The high limit thermostat may be of the liquid expansion type rather than electrically controlled. This is possible because of the close location of the control assembly 18 to the heating unit 10.

The heat transfer unit 10 is shown in detail in FIGURE 3. This unit comprises three parallelly arranged elongated chambers 26, 27 and 28. The chamber 27 is preferably located between the other two and may be termed an intermediate chamber. The uppermost chamber 26 and the intermediate chamber 27 have a common wall 29 having a slot 30 extending nearly the full length of the elongated chambers 26 and 27. While the slot 30 is shown as being continuous it may also be interrupted, i.e., consist of several short slots with sections of the common wall 29 between the slots. Likewise, the intermediate chamber 27 and the lower chamber have a common wall 31 having a slot 32 opening therethrough to provide communication between the lower chamber 28 and the intermediate chamber 27.

Figure 4:
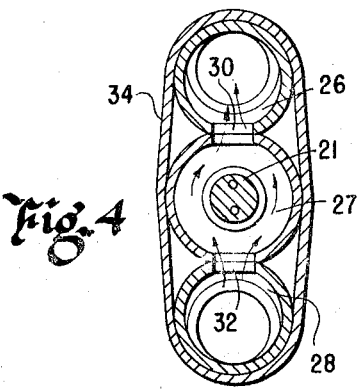
FIGURE 4 is a cross section taken along the line 4—4 of FIGURE 3.
Figure 5:
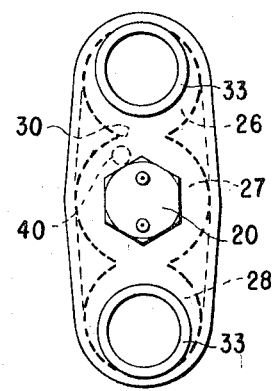
FIGURE 5 is an end elevation of the heat transfer unit as seen from line 5—5 of FIGURE 3.

The immersion electrical heating element 21 extends axially through the greater portion of the length of the intermediate chamber 27 and, as may be seen in FIGURE 4, is located between the slots 32 and 30.

The upper and lower chambers 26 and 28 are fitted, on at least one end of each, with couplings 33 adapted to receive the ends of the tube 16 of the radiator 14.

If desired, the assembly of the three chambers 26, 27 and 28 may be enclosed within a housing 34 that fits snugly over the chambers 26 and 28 and bulges outwardly slightly to accommodate the larger diameter of the intermediate chamber 27.

The upper chamber 26 is provided with a tapped opening 35 that is closed with a pipe plug 36 to provide access to the interior for filling the system with liquid. The system also has an expansion tank 37 (FIGURE 1) connected near the top of one of the radiator tubes 16. One or both of the tubes 16 may be provided with a drain plug 38 thus providing means to drain the system should that be necessary. A drain plug may also be provided in the bottom of the lower chamber 28.

Preferably the slots 30 and 32 are narrower than the diameter of the immersion heater element 21 but the total cross-sectional area in each slot should be generally equal to the cross-sectional area of two of the couplings 33 so that the velocity of the liquid flowing in the tubes 16 and through the couplings 33 is generally equal to the velocity of liquid flowing through the slots 30 and 32. This tends to maintain a substantially constant liquid velocity through the system which is desirable to maintain the maximum flow possible with a given temperature difference between the temperatures of the liquid in the lower chamber 28 and the upper chamber 26.

This system is very efficient insofar as inducing a liquid flow through the system because any liquid around the immersion heater 21, as it is heated, tends to rise and collect at the slot 30 between the intermiate chamber 27 and the upper chamber 26. From here it may either recirculate along the walls of the intermediate chamber 27 or flow into the upper chamber 26 with resulting flow through the radiators 14 and back to the lower chamber 28. The circulation within the intermediate chamber 27 causes all of the liquid within this chamber to quickly rise in temperature as the immersion heater is energized and the resulting thermal gradient between the liquids in the slots 30 and 32 produces an initial flow of liquid through the radiators. As soon as this flow starts the chamber 26 fills with the hot liquid thus accelerating the flow from the lower chamber 28 up through the heating chamber 27 to the top chamber 26.

This unit is safeguarded by a high limit temperature control of the control assembly 18 located in a thin wall receiver 40 located closely adjacent the end of the immersion heating element 21.

Baseboard type space heaters embodying the improved heat transfer unit, as illustrated in FIGURES 3 and 4, may be operated substantially at atmospheric pressure in the closed and sealed system and at temperatures in the order of 190 to 200° F. without forming bubbles of vapor on the surface of the heating element 21. This is believed to occur because of the relatively rapid liquid flow past the heating element throughout substantially its entire length thus scrubbing off any hot liquid before it has a chance to vaporize. As a result of this action, the heater is silent in operation even when operating at full capacity since there is no incipient boiling of the liquid with the formation and subsequent collapse of vapor bubbles in the liquid causing noise.

The same type of heat transfer unit, such as the unit 10, may be used with an upright radiator positioned above the unit such as may be recessed between the studding of a room wall. In this arrangement the horizontally positioned heat transfer unit is connected between the lower ends of the radiator tube, with one tube end connected to one end of the upper chamber and the other tube end connected to the opposite end of the lower chamber. This arrangement takes advantage of the operating principles of the heat transfer unit to secure a rapid transfer of the maximum amount of heat from the immersion heater 21 into the liquid without allowing any portion of the immersion heater 21 to vaporize any of the liquid and thus produce noise.

Various modifications of the structure may be made without departing from the scope of the invention.

Having described the invention, I claim:

1. An electric water heater for a baseboard space heater, comprising, a first elongated chamber adapted to be positioned horizontally, an electric heating element located within and extending lengthwise of said chamber, a second chamber located above and extending parallel to said first chamber, means joining said chambers and providing communication between said chambers throughout a major portion of the length of said heating element, a third chamber located beneath said first chamber and extending parallel thereto, means joining said first and third chambers and providing communication therebetween throughout a major portion of the length of said heating element, and means at an end of said second and third chambers to receive the ends of a radiator tube.

2. An electric water heater for a baseboard space heater, comprising, an assemblage of three parallelly extending elongated chambers, means providing communication between one of said chambers and each of the other chambers throughout a major portion of the length of each chamber, an electric heating element installed within and extending substantially the full length of said one chamber, said assemblage being adapted to be installed with one of said other chambers above and one below said heating element, and means at an end of each of said other chambers to receive the ends of a radiator tube.

3. An electric water heater for a baseboard space heater comprising, means providing three parallelly extending elongated chambers arranged with a first chamber located between the other two, said means providing communication between said first chamber and each of the other two along a major portion of their lengths, a heating element mounted in and extending substantially the full length of said first chamber, and means for connecting a radiator tube between the ends of said other two chambers.

4. An electric water heater for a baseboard space heater comprising, means providing three parallelly extending elongated chambers arranged with a first of the chambers located between the other two, said means providing narrow slots extending a major portion of the length of the chambers and providing communication between said first chamber and each of the other two, an electric heating element mounted in and extending substantially the full length of the first chamber, and means for connecting a radiator tube to adjacent ends of said other chambers.

5. An electric water heater for a baseboard space heater comprising, a first elongated generally cylindrical body forming a first chamber, an electrical heating element mounted in said first chamber and extending generally axially thereof, a second and a third generally cylindrical body extending parallelly adjacent and connected to the first chamber, said bodies being arranged with slots substantially coextensive with the active portion of said heating element providing communication between the first chamber and each of the second and third chambers, said chambers having their axes horizontal, with the slots located above and below the heating element, and means for connecting a radiator tube to the second and third chambers.

References Cited by the Examiner
UNITED STATES PATENTS

| 1,069,679 | 8/1913 | De Wallace | 219—341 |
| 2,700,505 | 1/1955 | Jackson | 237—8 X |

RICHARD M. WOOD, *Primary Examiner.*

ANTHONY BARTIS, *Acting Examiner.*

C. L. ALBRITTON, *Assistant Examiner.*